Jan. 10, 1933.    J. B. STRAUSS    1,893,510
SLEEPING CAR
Filed Jan. 8, 1930    2 Sheets-Sheet 2
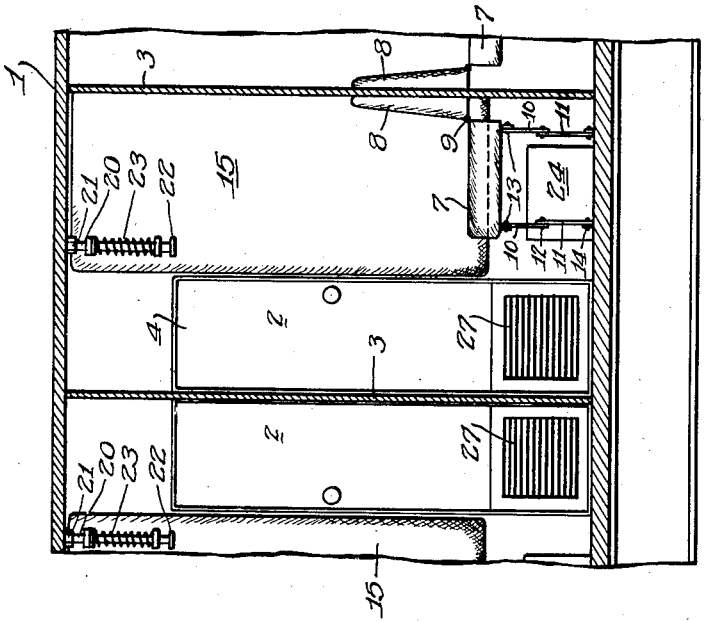
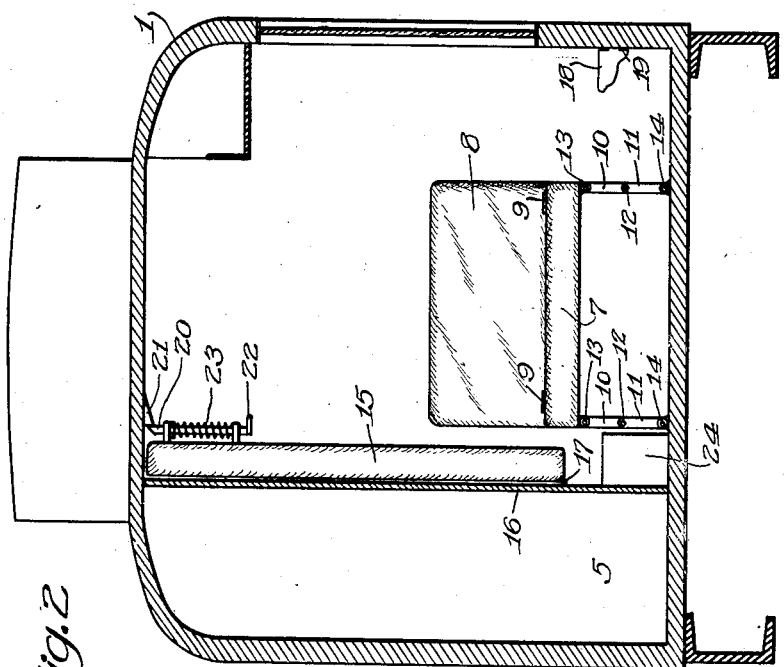
Inventor:
Joseph B. Strauss
By Parker & Carter Attys Patented Jan. 10, 1933

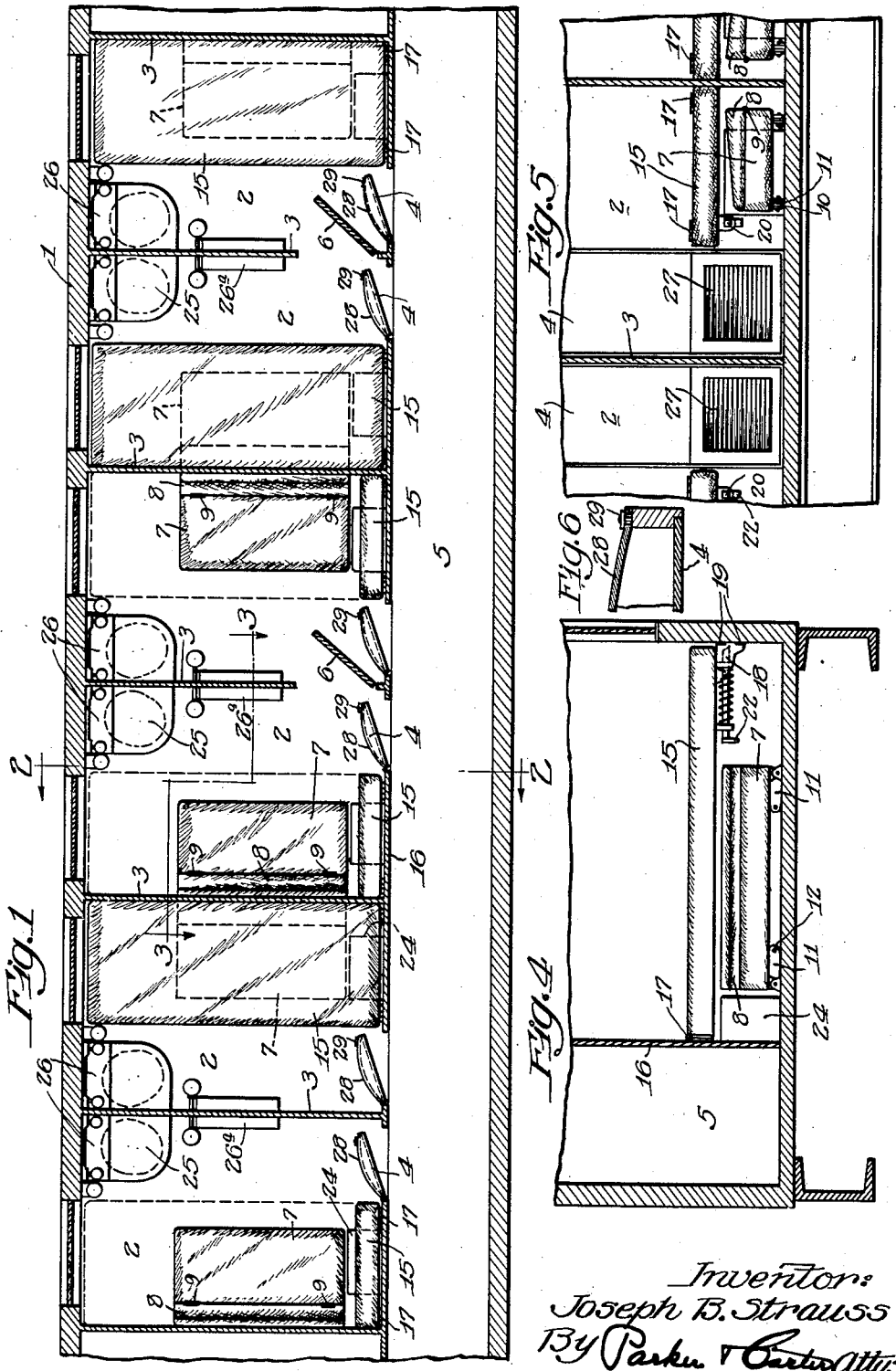

1,893,510

UNITED STATES PATENT OFFICE

JOSEPH B. STRAUSS, OF CHICAGO, ILLINOIS

SLEEPING CAR

Application filed January 8, 1930. Serial No. 419,237.

This invention relates to improvements in sleeping cars and has for its object to provide a new and improved device of this description.

The invention has as a further object to provide a bedroom sleeping car having a series of compartments arranged with a bed at night and a seat in the daytime.

The invention has as a further object to provide a bedroom car with a bed and a seat located in the same position, the bed to be used at night and the seat in the daytime.

The invention has further objects which are more particularly pointed out in the accompanying description.

Referring now to the drawings, Fig. 1 is a horizontal, sectional view through one form of car embodying the invention, with parts omitted.

Fig. 2 is a sectional view with parts omitted, taken on line 2—2 of Fig. 1.

Fig. 3 is a sectional view taken on line 3—3 of Fig. 1 with parts omitted.

Fig. 4 is a view similar to Fig. 2 showing the bed in its operative position.

Fig. 5 is a view similar to Fig. 3 showing the bed in its operative position.

Fig. 6 is a fragmentary, horizontal, sectional view through one of the doors.

Like numerals refer to like parts throughout the several figures.

Referring now to the drawings, I have shown a car 1 provided with a series of compartments 2. These compartments are separated by partitions 3. Each compartment is provided with a door 4 which opens upon a passageway 5 extending along the car. The doors are preferably arranged so that suits or other wearing apparel may be placed in the door so as to be protected in transit. The partitions 3 may be provided with doors 6 which can be locked or can be unlocked when it is desired to connect the compartments. Each compartment is provided with a seat 7 which has a back 8 hinged to the seat by the hinges 9. The seat is shown in its operative position in Figs. 1, 2, and 3. This seat is made so that it may be lowered. This result is shown in the accompanying drawings by providing the seat with legs made up of two sections 10 and 11 pivoted together at 12. The section 10 is pivoted to the seat at 13 and the section 11 is pivoted to the floor at 14. When it is desired to lower the seat, the back 8 is folded over on the seat and the legs are collapsed, the seat taking the position shown in Figs. 4 and 5. The bed 15 is a complete bed in itself and ready for use. A wall 16 is located opposite the window of the car, the seat being between the wall 16 and the window.

This bed is connected to the wall 16 of the compartment so that it may be moved up against the wall out of the way when it is desired to use the seat. In the construction shown, this connection is made by means of hinges 17. The opposite wall of the compartment is provided with supports 18 on which the other end of the bed rests. These supports are preferably hinged to the wall as by means of the hinges 19 so that they may be moved against the wall when not in use and thus be out of the way. When the seat is to be used, the bed is folded up against the wall 16 as shown in Figs. 2 and 3. There is preferably some suitable means for holding the bed in this position as, for example the spring latch 20 which engages stop 21 at the top of the car and which can be easily released by the handle 22. The spring 23 normally keeps the latch in position to engage the stop 21. The space under the end of the bed may be provided with a suitable box 24 for shoes or any other articles desired.

Each compartment is provided with a toilet 25 and a wash bowl 26. The wash bowl is shown as a folding bowl which can be moved out of the way when not in use and which is located above the toilet. The bowl is shown in its folded position in Fig. 1. Each room is also provided with a folding table 26a which is folded up against the partition when not in use as shown in Fig. 1. The doors are preferably provided at the bottom with ventilators 27, the upper part of the doors are hollow and are provided with a panel 28 which is held closed by a latch 29. When this latch is released, the panel may be opened and wearing apparel placed inside of the door so as to be out of the way and properly protected.

The use and operation of my invention are as follows:

The car is arranged with regular bedrooms having beds therein but is also arranged so that it may be used in the daytime thus making it a day and night car with a regular bed. In the daytime, the bed is moved to its inoperative position against the wall, as shown in Figs. 2 and 3 and the seat is moved to its operative position so that the passengers may be seated thereon. At night the backs of the seats 8 are folded down upon the seats and the legs collapsed so as to collapse the seats and bring them into the position shown in Figs. 4 and 5. The beds are then moved down until they rest on the supports 18, the beds in their operative position being above the seats.

It will thus be seen that I have here in each compartment a seat and a separate bed which occupy substantially the same space alternately. It will further be seen that no part of the seat is used in making the bed and no part of the bed is used as the seat, the two being entirely separate but adapted to be alternately used in the same position.

It will further be seen that each compartment has all of the necessary conveniences and they are arranged so that the compartments may be of a minimum size with a maximum usable space. The passengers' clothes can also be protected by hanging them in the hollow door.

I claim:—

1. A sleeping car comprising a series of enclosed compartments having an outer wall having a window therein, an opposed wall at a distance therefrom and a floor, a bed in each compartment hinged at one end to said opposed wall, a seat entirely separate from and independent of said bed, in each compartment, the bed and seat when in their operative positions being in the same vertical alignment and means for moving either of them to its inoperative position when the other is being used.

2. A sleeping car comprising a series of enclosed compartments having an outer wall having a window therein, an opposed wall at a distance therefrom and a floor, a bed in each compartment adapted to be folded up against said opposed wall of the compartment, a seat entirely separate from and independent of said bed, in each compartment adapted to be folded against the floor of the compartment, the seat and bed adapted to be alternately used and projecting across the same space when in use.

3. A sleeping car comprising a series of enclosed compartments having an outer wall having a window therein, an opposed wall at a distance therefrom and a floor, a bed in each compartment hinged at its end to said opposed wall of the compartment, a seat entirely separate from and independent of said bed, in each compartment foldably connected with the floor of the compartment, the bed adapted to be moved on its hinge up against the wall so as to be out of the way of the seat when the seat is moved about its hinge to the operative position the seat being located between the bed and the window when the bed is in its inoperative position.

4. A sleeping car comprising a series of enclosed compartments transversely to the car axis, a bed in said compartments lengthwise thereof, said bed movably attached to the end wall of the compartment and adapted to be folded back against said end wall, a fastening device securing said bed to said end wall, a door and passageway adjacent said bed, a seat underneath the bed when said bed is in its operative position and adapted to be moved into operative postion when the bed is not in use, whereby the compartment may be used in day and night service.

5. A sleeping car comprising a series of enclosed compartments transversely to the car axis, a bed in said compartments lengthwise thereof, said bed movably attached to the end wall of the compartment and adapted to be folded back against said end wall, a fastening device securing said bed to said end wall, a door and passageway adjacent said bed, a seat underneath the bed when said bed is in its operative position, said seat facing the passageway and adapted to be moved into operative position when the bed is not in use, whereby the compartment may be used in day and night service.

6. A sleeping car comprising a series of enclosed compartments, a night bed in each compartment, an outer wall for said compartments having a door opening, a door for said door opening, the night bed movably attached on one edge thereof to the said wall at one side of the door opening, a day seat entirely independent of said night bed and means whereby either said night bed or said day seat may be moved out of the way of the other and secured in an inoperative position, whereby the compartment is usable for both night and day service.

Signed at Chicago county of Cook and State of Illinois, this 18th day of December 1929.

JOSEPH B. STRAUSS.